Figure 2:
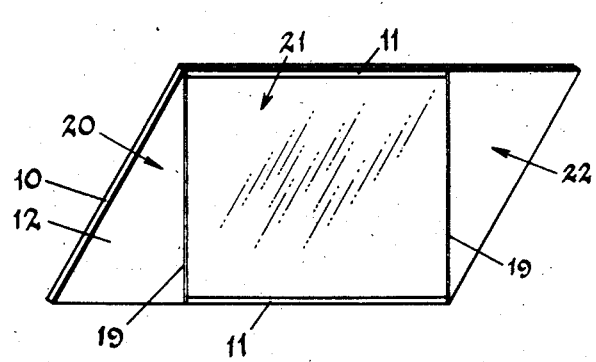

April 28, 1959   C. M. BROWNE   2,884,313
METHOD OF REMOVING AN ELECTRICALLY CONDUCTING FILM
Filed Sept. 7, 1955

INVENTOR.
Charles M. Browne
BY
Hobbe & Swope
ATTORNEYS

# United States Patent Office 2,884,313
Patented Apr. 28, 1959

2,884,313

METHOD OF REMOVING AN ELECTRICALLY CONDUCTING FILM

Charles M. Browne, Toledo, Ohio, assignor to Libbey-Owens-Ford Glass Company, Toledo, Ohio, a corporation of Ohio Application September 7, 1955, Serial No. 532,889

9 Claims. (Cl. 41—43)

The present invention relates broadly to transparent electrically conducting metal oxide films and more particularly to a method for removing selected portions of such films from surfaces to which they have been applied.

Transparent, electrically conducting films of tin oxide, for example, are quite widely known; and such films have come into rather extensive commercial use in connection with the production of deicing windows and windshields of aircraft. Such a film may be obtained by spraying the glass while heated to substantially its point of softening, with tin tetrachloride or other suitable tin compounds to produce a film primarily of a tin oxide which is electrically conducting. One of the characteristics of these films is their extremely tight adherence to vitreous surfaces, like glass, when applied thereto. In fact, it has been said that a properly applied electrically conducting coating of tin oxide on a glass sheet is very nearly as hard and as difficult to remove as the glass surface itself.

Nevertheless, it is very often necessary in the production of glass articles provided with such a film to remove selected strips or areas of the film to facilitate testing of the unit, to improve its appearance or utility, or to control or regulate the conductivity of the filmed surface.

The present invention is particularly applicable in providing a plurality of areas of electrically conducting films which are separated by nonconducting areas which are in the form of thin lines.

It is a primary object of this invention to provide a method for removing films of the above character quickly and without injury to the supporting surface.

Another object of this invention is the provision of a method of removing such films in the form of a narrow line by electrical means.

A further object is the provision of a method of removing a line of electrically conducting material in which the removal may be done accurately and quickly and in which the line removed is of a uniform width throughout.

Other objects and advantages of the invention will become more apparent during the course of the following description, when taken in connection with the accompanying drawings.

Figure 1:
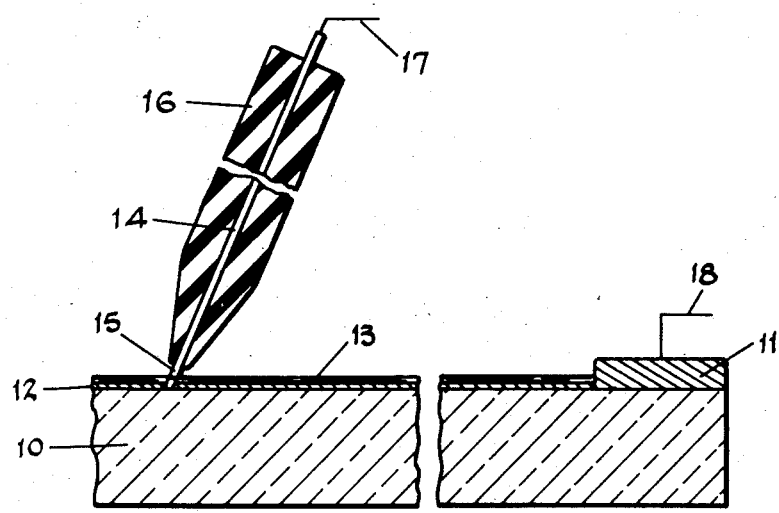

In the drawings, wherein like numerals are employed to designate like parts throughout the same:

Fig. 1 is a diagrammatic showing of a preferred form of the method in which my invention may be carried out; and Fig. 2 is a perspective view illustrating a sheet of glass having a transparent electrically conducting film in which lines have been deleted therefrom according to this invention.

Generally stated, my invention is based on the discovery that an electrically conducting film may have a portion thereof deleted in the form of a line by coating the film with an organic liquid, applying an electric potential between the film and an electrode, and contacting the electrically conducting film with the electrode. In order to remove the film in the form of a line it is only necessary to move the electrode over the electrically conducting film at a writing speed. It is not known exactly how the deletion is accomplished, but it is believed that the organic liquid acts as a dielectric and that an arc travels therethrough due to the electric potential between the electrode and the electrically conducting film. This arc probably causes a decomposition of the organic material in which hydrogen is formed or at least reducing conditions are provided so that the tin oxide film is reduced to metallic tin. The remaining metallic tin is substantially nonconducting but, if desired, it may be removed with a dilute acid solution.

In Fig. 1 there is shown a light of glass 10 having a fired-on electrode 11 and an electrically conducting film 12 of a metal oxide and preferably tin oxide. In order to remove a portion of the electrically conducting film 12 a layer of an organic material 13 such as glycerin is brushed, sprayed or otherwise applied over the film 12. A carbon electrode 14 is sharpened to a point 15 having a width corresponding to the desired width of the line of material to be deleted. In fact, an ordinary graphite pencil may be used having a rod for the electrode 14 and a wooden case 16 which encloses the electrode 14. Preferably, a direct current is used, and the carbon electrode is connected to the positive post through lead wire 17, and the bus bar or fired-on silver strip 11 is connected to the negative post of the direct current supply through lead wire 18. However, the film may be deleted when the electrical connection is in the reverse of that given or even when an alternating current is applied. After the electric potential has been connected, the carbon electrode is placed in contacted position, as shown in Fig. 1, and moved over the surface 12 to form a line of deleted electrical conducting film in the desired pattern.

Generally, any organic liquid may be used, but some are superior to others. For example, light oil may be used but it is not so easily removed as glycerin. Other operable materials may have disagreeable odors or create a fire hazard or for other reasons be inferior to glycerin, but it is to be understood that such materials may be used in the practice of this invention.

Preferably, carbon is used for the electrode although other materials may be used. Carbon has the advantage of being easily sharpened to the desired width.

The voltage must be sufficient to produce an arc through the organic material, but excessive voltages should be avoided due to excessive temperatures produced thereby. Preferably, the voltage used is between 25 and 100 volts.

In Fig. 2, there is shown light of glass having lines 19 deleted thereon to form separate areas 20, 21 and 22 of electrically conducting film. Such lights of glass are used in the aircraft industry and the illustrated shape is often used. Lights having portions deleted therefrom are also proposed for use in automobiles. In such situations, the whole light is filmed with tin oxide to provide a light of a uniform appearance. The lines 19 are narrow enough so that the uniform appearance is maintained while at the same time the area 21 is uniformly heated to prevent frost formation or remove the same in the critical area.

It is contemplated that other uses may be made of the present deletion method, and it is to be understood that the use illustrated in Fig. 2 is not to be construed as the only use to which this method is applicable.

Although this method of deleting a portion of an electrically conducting film is particularly valuable in deleting an area in the form of a line, it is to be understood other areas may be deleted simply by moving the carbon electrode to delete juxtaposed parallel lines so that an area of unlimited width may be formed, or that a line may be formed in such a way that an area is enclosed within the line which is completely set off from the main electrically conducting film. It has been found that a line may be traced in the form of a circle and that the resistance between the film on the inside of the circle and the film outside the circle is in the range of megohms. Accordingly, areas may be deleted as well as lines.

It is to be understood that the forms of the invention herewith shown and described are to be taken as illustrative embodiments only of the same, and that various procedural changes may be resorted to without departing from the spirit of the invention or the scope of the subjoined claims.

I claim:

1. A method of removing selected portions of an electrically conducting metal oxide film from ceramic material comprising, coating the film with a dielectric organic liquid, establishing a voltage between an electrode and the metal oxide film, and contacting the organic liquid overlying the metal oxide film with the electrode.

2. A method of removing selected portions of an electrically conducting tin oxide film from ceramic material comprising, coating the film with a dielectric organic liquid, establishing a voltage between a carbon electrode and the electrically conducting film, and contacting the organic liquid with the carbon electrode.

3. A method of removing selected portions of an electrically conducting tin oxide film from ceramic material comprising, coating the film with a dielectric organic liquid, establishing a voltage of between 25 and 100 volts between a graphite electrode and the electrically conducting film, and contacting the organic liquid with the graphite electrode.

4. A method of removing selected portions of an electrically conducting tin oxide film from ceramic material comprising, coating the film with a dielectric organic liquid, establishing a voltage of between 25 and 100 volts between a sharpened graphite electrode and the electrically conducting film, contacting the organic liquid with the graphite electrode, and moving the electrode lineally over the surface of the organic liquid.

5. A method of removing selected portions of an electrically conducting tin oxide film from ceramic material comprising, coating the film with a dielectric organic liquid, establishing a direct current voltage of between 25 and 100 volts between a sharpened graphite electrode and the electrically conducting film, the electrode being connected to the positive post of the direct current source and the film being connected to the negative post of the direct current source, contacting the organic liquid with the graphite electrode, and moving the electrode lineally over the surface of the organic liquid.

6. A method of removing selected portions of an electrically conducting tin oxide film from a ceramic body comprising, coating the film with glycerin, establishing a voltage between a carbon electrode and the electrically conducting film, and contacting the exposed surface of the glycerin with the carbon electrode.

7. A method of removing selected portions of an electrically conducting tin oxide film from a ceramic body comprising, coating the film with glycerin, establishing a voltage of between 25 and 100 volts between a graphite electrode having a sharpened point and the electrically conducting film, and contacting the exposed surface of the glycerin with the point of the graphite electrode.

8. A method of removing selected portions of an electrically conducting tin oxide film from ceramic material, comprising coating the film with a dielectric organic liquid, establishing a voltage between an electrode and the electrically conducting film, contacting the organic liquid on the film with the electrode and moving the same lineally over the surface of the film to reduce a line of tin oxide substantially to metallic tin, and subjecting the film to an acid solution to remove the newly formed tin metal.

9. A method of removing an electrically conducting film as defined in claim 8, in which the organic liquid is glycerin.

References Cited in the file of this patent

UNITED STATES PATENTS

| | | |
|---|---|---|
| 2,248,057 | Bond | July 8, 1941 |
| 2,486,281 | Henry | Oct. 25, 1949 |
| 2,513,838 | Beall | July 4, 1950 |
| 2,722,511 | Butler et al. | Nov. 1, 1955 |
| 2,739,112 | Ferguson | Mar. 20, 1956 |

FOREIGN PATENTS

| | | |
|---|---|---|
| 637,793 | Great Britain | May 24, 1950 |
| 718,442 | Great Britain | Nov. 17, 1954 |